US010649457B2

(12) United States Patent
Foster et al.

(10) Patent No.: US 10,649,457 B2
(45) Date of Patent: May 12, 2020

(54) SYSTEM AND METHOD FOR AUTONOMOUS VEHICLE SYSTEM PLANNING

(71) Applicants: CNH Industrial America LLC, New Holland, PA (US); Autonomous Solutions, Inc., Mendon, UT (US)

(72) Inventors: Christopher Alan Foster, Mohnton, PA (US); John Henry Posselius, Ephrata, PA (US); Bret Todd Turpin, Wellsville, UT (US); Daniel John Morwood, Petersboro, UT (US); Nathan Eric Bunderson, Providence, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 272 days.

(21) Appl. No.: 15/585,002

(22) Filed: May 2, 2017

(65) Prior Publication Data
US 2018/0321683 A1 Nov. 8, 2018

(51) Int. Cl.
*G05D 1/02* (2020.01)
*G05D 1/00* (2006.01)
*G06N 99/00* (2019.01)
*G06N 20/00* (2019.01)
*A01B 69/04* (2006.01)
(Continued)

(52) U.S. Cl.
CPC ......... *G05D 1/0221* (2013.01); *A01B 69/008* (2013.01); *G05D 1/0219* (2013.01); *G06N 20/00* (2019.01); *G01C 21/165* (2013.01); *G01C 21/32* (2013.01); *G05D 2201/0201* (2013.01)

(58) Field of Classification Search
CPC .. G05D 1/0221; G05D 1/0088; G05D 1/0219; G05D 2201/0201; G06N 20/00; A01B 69/008; G01C 21/165; G01C 21/32
USPC .......................................................... 701/25
See application file for complete search history.

(56) References Cited

U.S. PATENT DOCUMENTS 5,974,348 A * 10/1999 Rocks ....................... G01S 1/70
348/120
6,112,143 A 8/2000 Allen et al.
6,128,574 A 10/2000 Dickhans
(Continued)

FOREIGN PATENT DOCUMENTS

WO WO-9321587 A2 * 10/1993 ............. G06N 20/00

OTHER PUBLICATIONS

Jeremy H. Brown; From Precision Farming to Autonomous Farming; How Commodity Technologies Enable Revolutionary Impact; Nov. 11, 2013; pp. 1-11.

*Primary Examiner* — Tuan C To
(74) *Attorney, Agent, or Firm* — Rebecca L. Henkel; Rickard K. DeMille

(57) ABSTRACT

A system includes a processor. The processor is configured to derive one or more partitions of a field based on a vehicle system data via a learning system. The processor is further configured to derive one or more turn features representative of vehicle turns in the field based on the vehicle system via the learning system. The processor is also configured to derive an autonomous vehicle plan based on the partitions of the field and the turn features via a planning system, wherein the autonomous vehicle plan comprises a planned route of the autonomous vehicle in the field.

19 Claims, 5 Drawing Sheets

(51) Int. Cl.
*G01C 21/32* (2006.01)
*G01C 21/16* (2006.01)

(56) References Cited

U.S. PATENT DOCUMENTS

| | | | |
|---|---|---|---|
| 6,795,786 B2 * | 9/2004 | LaMarca | G01D 9/005 |
| | | | 700/217 |
| 6,907,336 B2 | 6/2005 | Gray et al. | |
| 6,934,615 B2 * | 8/2005 | Flann | A01B 69/008 |
| | | | 172/2 |
| 7,010,425 B2 * | 3/2006 | Gray | A01B 69/008 |
| | | | 172/2 |
| 7,539,557 B2 | 5/2009 | Yamauchi | |
| 7,742,860 B2 | 6/2010 | Diekhans et al. | |
| 8,108,138 B2 | 1/2012 | Bruce et al. | |
| 8,126,642 B2 * | 2/2012 | Trepagnier | G01S 17/023 |
| | | | 701/423 |
| 8,170,785 B2 | 5/2012 | Diekhans et al. | |
| 8,209,075 B2 | 6/2012 | Senneff et al. | |
| 8,332,135 B2 | 12/2012 | Diekhans et al. | |
| 8,571,742 B2 * | 10/2013 | Takeoka | G05D 1/024 |
| | | | 701/23 |
| 8,718,329 B2 | 5/2014 | Zhang et al. | |
| 8,849,494 B1 * | 9/2014 | Herbach | B60W 30/00 |
| | | | 701/24 |
| 8,930,058 B1 * | 1/2015 | Quist | G05D 1/0221 |
| | | | 318/568.13 |
| 9,174,672 B2 * | 11/2015 | Zeng | G05D 1/024 |
| 9,248,834 B1 | 2/2016 | Ferguson et al. | |
| 9,612,128 B2 * | 4/2017 | Delling | G01C 21/3484 |
| 9,933,787 B2 * | 4/2018 | Story | G05D 1/0278 |
| 10,139,826 B2 * | 11/2018 | Berkemeier | G05D 1/0212 |
| 10,338,240 B2 * | 7/2019 | Berron | G01V 1/003 |
| 2005/0075785 A1 * | 4/2005 | Gray | A01B 69/008 |
| | | | 701/410 |
| 2006/0040239 A1 | 1/2006 | Kuechler et al. | |
| 2012/0185113 A1 * | 7/2012 | Pampus | B60W 30/06 |
| | | | 701/1 |
| 2013/0081830 A1 * | 4/2013 | Tuttle | A01B 63/22 |
| | | | 172/1 |
| 2014/0324345 A1 * | 10/2014 | Story | G05D 1/0278 |
| | | | 701/540 |
| 2016/0052546 A1 * | 2/2016 | Arakane | B62D 15/025 |
| | | | 701/41 |
| 2016/0265922 A1 | 9/2016 | Thakur et al. | |

* cited by examiner

SYSTEM AND METHOD FOR AUTONOMOUS VEHICLE SYSTEM PLANNING

BACKGROUND

The invention relates generally to autonomous vehicle systems, and more specifically, to autonomous vehicle system planning applications.

Certain vehicles, such as agricultural tractors may be operated in fields having a variety of soil conditions and obstacles. For example, an autonomous vehicle such as a tractor may be driven through a field having soft soil (e.g., due to a high moisture content of the soil), around ponds, in proximity to human structures and boundaries (e.g., fences, barns), and so on. Generally, the autonomous vehicle may be provided a plan that may be used by the autonomous vehicle to follow certain paths and to avoid certain terrain features, as well as for following agricultural operations such as planting, fertilizing, and so on. It may be beneficial to improve the planning of autonomous vehicle system operations.

BRIEF DESCRIPTION

In one embodiment, a system includes a processor. The processor is configured to derive one or more partitions of a field based on a vehicle system data via a learning system. The processor is further configured to derive one or more turn features representative of vehicle turns in the field based on the vehicle system via the learning system. The processor is also configured to derive an autonomous vehicle plan based on the partitions of the field and the turn features via a planning system, wherein the autonomous vehicle plan comprises a planned route of the autonomous vehicle in the field.

In a further embodiment, a method deriving one or more partitions of a field based on a vehicle system data via a learning system. The method also includes deriving one or more turn features representative of vehicle turns in the field based on the vehicle system via the learning system. The method additionally includes deriving an autonomous vehicle plan based on the partitions of the field and the turn features via a planning system, wherein the autonomous vehicle plan comprises a planned route of the autonomous vehicle in the field.

In another embodiment, non-transitory, computer readable medium comprise instructions that when executed by a processor cause the processor to derive one or more partitions of a field based on a vehicle system data via a learning system. The instructions when executed by the processor further cause the processor derive one or more turn features representative of vehicle turns in the field based on the vehicle system via the learning system. The instructions when executed by the processor additionally cause the processor to derive an autonomous vehicle plan based on the partitions of the field and the turn features via a planning system, wherein the autonomous vehicle plan comprises a planned route of the autonomous vehicle in the field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Certain agricultural and other operations (mining, construction, and the like) may use an unmanned and/or manned vehicle such as a tractor or other vehicle. For agricultural operations, the vehicle may tow or include an agricultural implement such as a planter, seeder, fertilizer, and so on. In operations, the vehicle uses a plan suitable for defining vehicle operations. For example, the plan may include a map having field boundaries, the plan may include driving paths, as well as row turns, agricultural operations (e.g., planting, seeding, fertilizing, plowing) and the like, that the autonomous vehicle system should follow. The vehicle then may autonomously operate based on plan data. While plan data may be designed, for example, via a human operator, e.g., a human planner, it may be beneficial to provide for techniques that may create and/or update a plan based on certain data, such as data derived from observations of a human operator (e.g., agricultural vehicle operator) working on a field. Accordingly, the techniques described herein include a learning system that may observe a human operator drive a vehicle system and that then learn how to operate within a certain field based on the observations.

In certain embodiments, the learning system may extract general features from the observations, such as a size of headlands, direction of rows, ordering of sections, turn types used, field partitioning, and so on. The extracted information may be stored and used when planning operations in the same field used to gather the observations. Learned parameters may be general so that they can be applied in a flexible way during planning. For example recording the actual path may be too specific because the recorded path may not be appropriate if implement width changes or obstacles are introduced to the field. The learning system would derive certain learned parameters but still flexibly modify the learned parameters based on certain changes to operations. For example if turn angle has been adjusted such that the autonomous vehicle can no longer turn inside of certain angles then the size of the headlands may be increased by the learning system. In this manner, a more efficient and productive plan may be realized, thus improving farming operations and increasing field yields.

Figure 1:
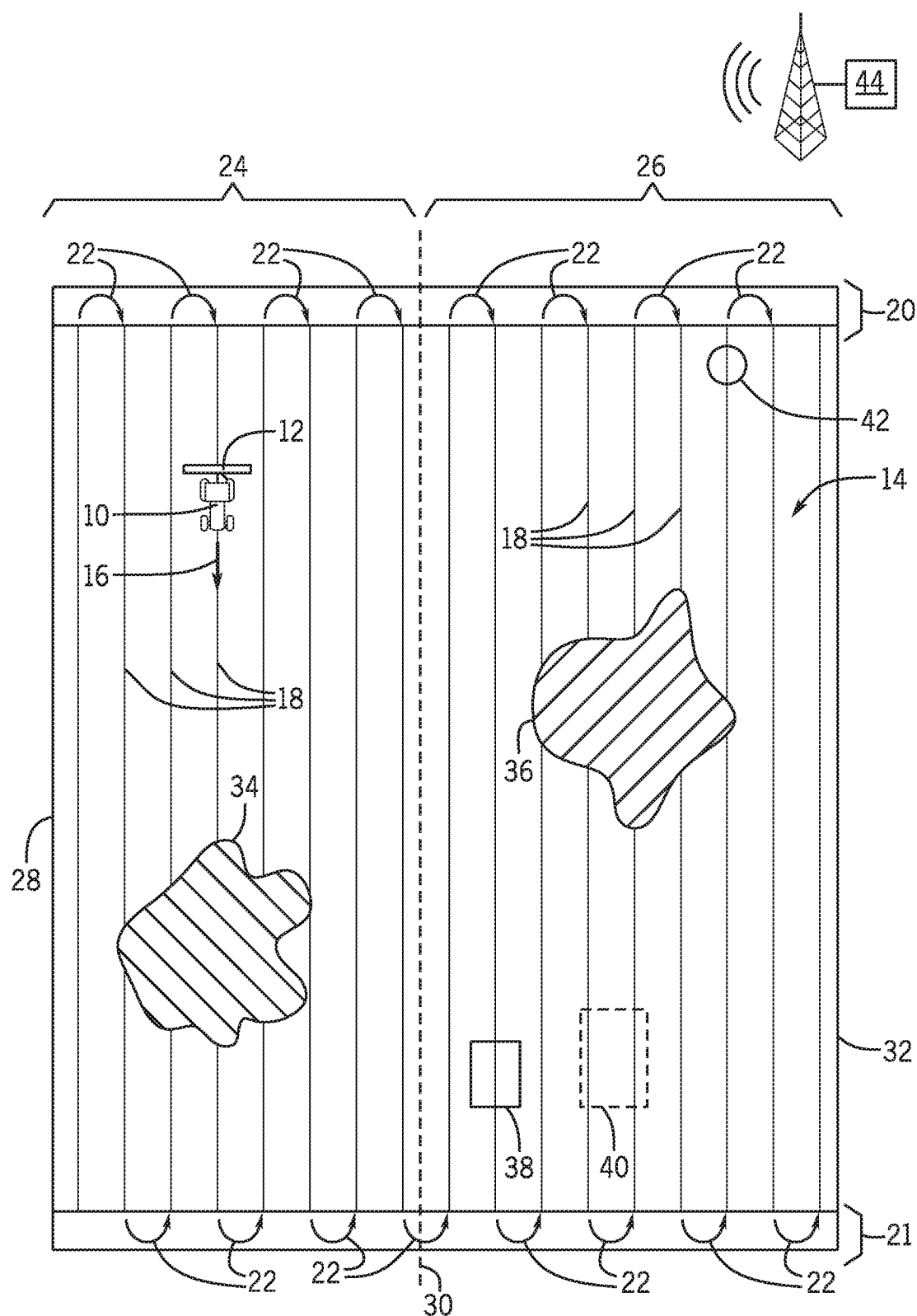
FIG. 1 is a schematic diagram of an embodiment of an agricultural vehicle and an agricultural implement operating within an agricultural field.

Turning now to FIG. 1, the figure is a schematic diagram of an embodiment of an agricultural vehicle 10 (e.g., autonomous and/or manned tractor) towing an agricultural implement 12 within an agricultural field 14. The agricultural vehicle 10 or other prime mover is configured to tow the agricultural implement 12 throughout the field 14 along a direction of travel 16. In certain embodiments, the agricultural vehicle 10 is directed (e.g., via an operator or an automated system) to traverse the field along substantially parallel rows 18. However, it should be appreciated that the agricultural vehicle 10 may be directed to traverse the field along other routes (e.g., along a spiral path, etc.) in alternative embodiments. As will be appreciated, the agricultural implement 12 may be any suitable implement for performing agricultural operations throughout the field 14. For example, in certain embodiments, the agricultural implement 12 may be a tillage tool, a fertilizer application tool, a seeding or planting tool, or a harvesting tool, among others. While the agricultural implement 12 is towed by the agricultural vehicle 10 in the illustrated embodiment, it should be appreciated that in alternative embodiments, the agricultural implement may be integrated within the agricultural vehicle 10. It should be noted that the techniques describe herein may be used for operations other than agricultural operations. For example, mining operations, construction operations, automotive operations, and so on. While the description herein refers to the agricultural vehicle 10 as a tractor, it is to be understood the v may be a mining vehicle, a construction vehicle, a passenger vehicle, and the like.

As the agricultural vehicle 10 and the agricultural implement 12 traverse the field during operations, the agricultural vehicle 10 and the agricultural implement 12 may be driven in certain directions 16 and preferred speeds by the human operator. The human operator may additionally select and use certain operational settings for the agricultural vehicle 10 and/or the agricultural implement 12, such as trench depth, seed flow rate, fertilizer flow rate, pump rates, pressures, height of equipment (e.g., planter height) and so on. As the end of a field is reached, the operator may turn, leaving headlands 20 and 21 unplowed and/or unplanted, and continue operations in adjacent or nearby row. Accordingly, turns 22 are shown. The turns 22 may include a turn direction (clockwise, counterclockwise), a turn angle, and so on.

The operator may partition the field into various sections. For example, two unplanted headlands 20, 21 sections are shown. The field is also partitioned into two planting sections 24, 26 having field edges 28, 30, and 30, 32, respectively. The planting sections 24 and 26 may be created for any variety of reasons, such as to have multiple crops, to operate differently because of soil conditions, because of terrain, because of geographical shape of the field, because of obstacles, and so on. While two headland sections 20, 21 and the two planting sections 24, 26 are shown, it is to be understood that the field may be partitioned into one or more planting sections and/or one or more headland sections. Indeed, depending on the operations involved (e.g., fertilizing, seeding, the geography of the field 14, the field 14 conditions, and so on), the field 14 may include multiple other partitions in addition to or alternative to headlands and planting partitions.

The agricultural vehicle 10 operator may choose various driving patterns with which to operate the agricultural vehicle 10 and the agricultural implement 12 in the field 14, such as a headland pattern, a circuitous pattern, a spiral pattern, and so on, as described in more detail below. As the agricultural vehicle 10 and the agricultural implement 12 are driven, the operator may encounter various field and/or soil conditions, as well as certain structures. Such field and/or soil conditions and structures may be defined as features for purposes of the description herein. For example, the agricultural vehicle 10 and the agricultural implement 12 may encounter features such as a pond 32, a tree stand 36, a building or other standing structure 38, fencing 40, points of interest 42, and so on. The points of interest 42 may include water pumps, above ground fixed or movable equipment (e.g. irrigation equipment, planting equipment), and so on. In certain embodiments, the agricultural vehicle 10 is communicatively coupled to a base station 44. Accordingly, geographic coordinates, agricultural vehicle 10 speed, agricultural vehicle 10 and/or agricultural implement 12 settings (e.g., fuel usage, fuel type, RPMs, trench depth, seed flow rate, fertilizer flow rate, pump rates, pressures, height of equipment), and so on, may be communicated to the base station 44 and/or to a local data logger disposed in the agricultural vehicle 10. Accordingly, drive and/or operational data may be gathered and the used, as described in more detail below, by a learning system suitable for improving planning applications.

Figure 2:
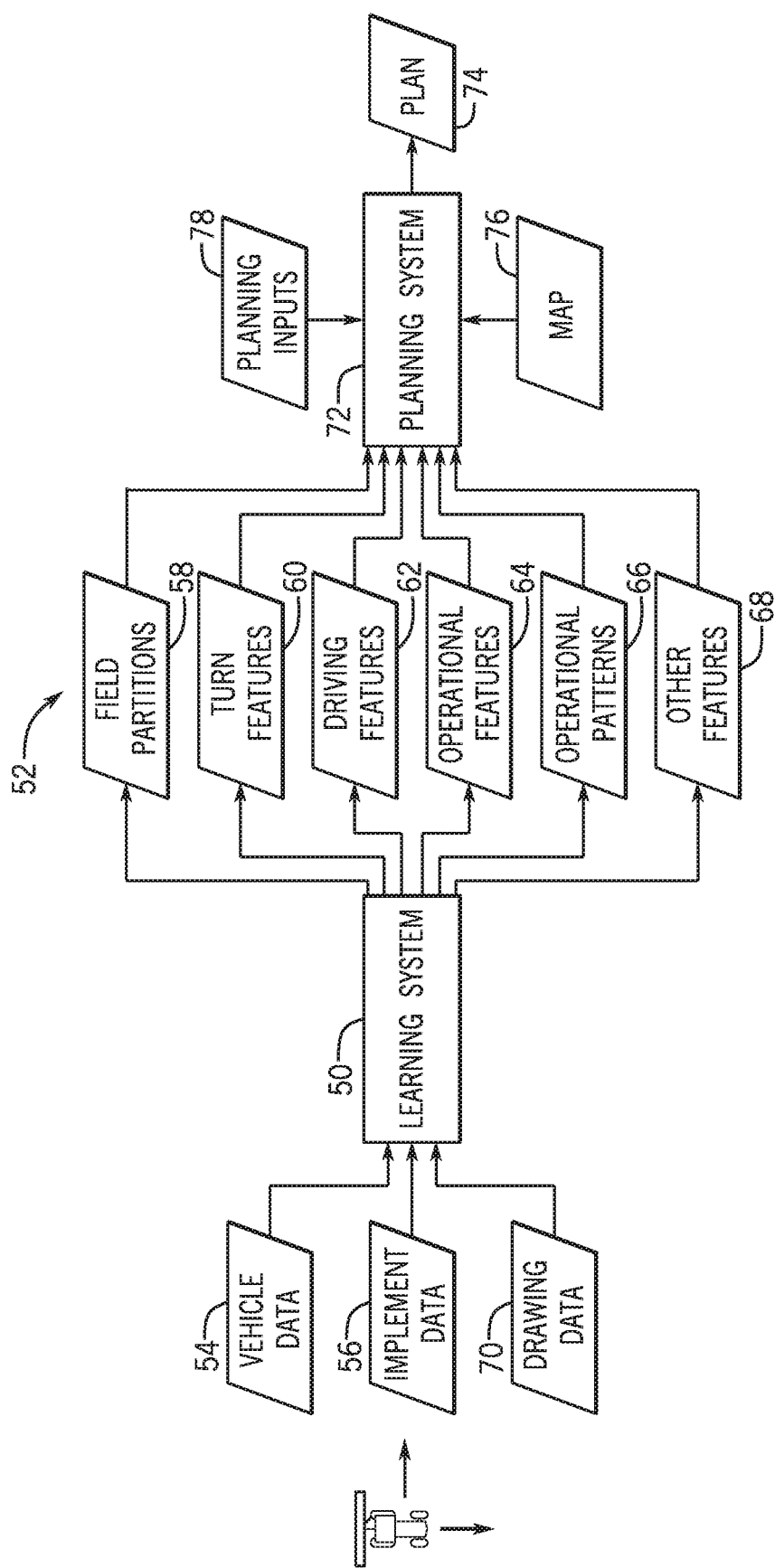
FIG. 2 is a block diagram of an embodiment of a learning system suitable for deriving one or more features based on observations of the agricultural vehicle and an agricultural implement operating within the agricultural field, and of an embodiment of a planning system suitable for creating a plan based on the derived features.

Turning now to FIG. 2, the figure is a block diagram of an embodiment of a learning system 50 suitable for deriving one or more planning features 52 based on driving observations of the agricultural vehicle 10 and/or the agricultural implement 12. As mentioned above, as the agricultural vehicle 10 and the agricultural implement 12 are driven during field 14 operations, various agricultural vehicle data 54 and agricultural implement data 56 may be collected and/or communicated to the learning system 50. The vehicle data 54 may include vehicle manufacturer, vehicle model, vehicle geographical data (e.g., times and geographical locations corresponding to each time over the course of a timeline comprising field 14 operations, such as planting operations, seeding operations, fertilizing operations, and so on), vehicle speed, vehicle direction, or a combination thereof.

Additionally, the vehicle data 54 may include on-board diagnostics II (OBDII) bus and/or controller area network (CAN) bus data such as oil pressure, miles per gallon (MPG), revolutions per minute (RPM), and so on. Implement data 56 may include data such as implement manufacturer, implement type (e.g., type of planter, type of row unit use to plant seed, type of closing system used to close ground trenches, type of fertilizer equipment), implement settings (height above ground, number of row units used in planting, spacing of row units), and/or implement operations data gathered during operations of the agricultural implement 12, such as seeding rates, fertilizer flow rates, pump rates, pressures including vacuum measures, and so on.

The planning features 52 extracted or otherwise "learned" by the learning system 50 may include field partitions 58, turn features 60, driving features 62, operational setting features 64, operating patterns 66, and other features 68. Deriving the field partitions 58 may include learning how operators divide the field 14 into sections or partitions, such as headland sections, planting sections, obstacle sections, fertilizing sections, harvesting sections, and so on. Accordingly, the field 14 may be split into various portions, such as square portions, circular portions, or other geometric and/or geographic shapes. The field partitions 58 may overlap. Additionally, the field partitions 58 may be different depending on field 14 operations. For example, field partitions 58 derived for planting operations may be different from field partitions 58 derived for harvesting operations.

Deriving turn features 60 may include deriving a type of turn 22 (e.g., clockwise, counterclockwise), a turn 22 angle, a turn 22 speed, and the like. Deriving driving features 62 may include deriving how operators approach driving during certain field 14 operations (e.g., planting, seeding, fertilizing) such as speeds used, direction of travel, slowdowns/ speedups, number of rows 18, spacing between the rows 18, pattern between the rows 18 (e.g., parallel rows, zig zag rows, spiral rows, circular rows), preferred route(s) around obstacles in the field 14, and so on. Deriving operational features 64 include, for example, deriving how the operator uses the agricultural implement 12 while driving. For example, the operator may set certain equipment based on the field partitions 58, the type of operations (e.g., planting, seeding, fertilizing), the time of the year (e.g., spring planting, fall planting), conditions in the field 14 (e.g., wet conditions, dry conditions), and so on. Accordingly, the operational features 64 derived by the learning system 50 may include agricultural implement 12 settings for a variety of field 14 conditions, for the field partitions 58, as well as how the agricultural implement 12 is used during operations (e.g., seed rates, fertilizer rates, equipment height, pressures, flows, and so on).

Deriving operational patterns 66 may include deriving driving patterns for the field 14 during operations of the agricultural vehicle 10 and the agricultural implement 12. For example, the operator may elect to drive in a spiral or circuit pattern, where operations may begin at an edge of a field partition 58 and the operator drives the agricultural vehicle 10 and the agricultural implement 12 towards a center of the partition 58 in a spiral or circle. Headland patterns may involve using some or all of the headlands 20, 21 for turning, and may further include one way patterns, gathering patterns, and/or casting patterns. In one way patterns the agricultural vehicle 10 and the agricultural implement 12 may be driven on rows 18 parallel to each other starting, for example, at the headland 21, and driving "up" towards the headland 20, turning "down" towards the headland 21, then turning back up towards the headland 20, and so on. Gathering patterns may involve beginning at the center of the field 14 and driving towards edges 28, 32. Casting patterns may involve starting first at the edges 28 or 32 and then working towards the center of the field 14. It is to be understood that any number of operational patterns 66 may be used, that result in spiral rows, parallel rows, zig zag rows, and so on. Other features 68 may be derived, including deriving that there are certain obstacles in the field 14 (e.g., pond 34, tree stand 36, building 38, fencing 40, points of interest 42).

It is also to be noted that the techniques described herein, in certain embodiments, may also use drawing data 70 in addition to or as an alternative to the vehicle data 54 and/or the implement data 56. For example, a user may "draw" on a map of the field 14 a preferred driving route for the agricultural vehicle 10 and the agricultural implement 12. The drawing may include the rows 18 and direction of travel for each row 18, as well as preferred turns 22. The user may also draw obstacles, headland sections, planting sections, fertilizer sections, field edges 28, 32, and so on. The user may further draw preferred row patterns (e.g., parallel rows 18, spiral rows, zig zag rows), turns, start/end points for the agricultural vehicle 10 and the agricultural implement 12, and so on. Additionally, the user may enter other data as drawing data 70, such as by typing in desired driving speeds, seed deposition rates, fertilizer rates, pressures, equipment type, equipment manufacturer, fuel type, and so on. In short, any and all data 54 and 56 may be manually entered by the user in addition to or as an alternative to observing operations of the agricultural vehicle 10 and the agricultural implement 12.

The learning system 50 may then apply certain artificial intelligence (AI) techniques, such as knowledge extraction techniques, neural network pattern matching techniques, data mining techniques, machine learning techniques, and so on, to derive the planning features 52. For example, rule-based system (e.g., forward chained expert systems, backward chained expert systems) may use one or more rules to determine the field partitions 58, the turn features 60, the driving features 62, the operational setting features 64, the operational patterns 66, and other features 68. In certain embodiments, experts, such as expert operators of the agricultural vehicle 10 and the agricultural implement 12 may be interviewed and knowledge elicitation techniques used during the interview to create the one or more rules for the rule-based system.

Likewise, neural networks, state vector machines (SVMs), and the like, may be trained to recognize patterns that result in deriving the field partitions 58, the turn features 60, the driving features 62, the operational setting features 64, the operational patterns 66, and other features 68. Similarly, data mining techniques such as clustering, classification, pattern recognition, and the like, may be used to derive the field partitions 58, the turn features 60, the driving features 62, the operational setting features 64, the operational patterns 66, and other features 68. Additionally or alternatively, machine learning techniques such as decision tree learning, association rule learning, deep learning, inductive logic programming, genetic algorithms, and so on, may be used to learn from data 54, 56, and/or 70 and identify the field partitions 58, the turn features 60, the driving features 62, the operational setting features 64, the operational patterns 66, and other features 68.

The planning features 52 may then be provided to planning system 72, which may use the planning features 52 as input to derive a plan 74. For example, the planning system 72 may use a map 76 of the field 14, along with a set of planning inputs 78. The planning inputs 78 may include the operation (e.g. planting, fertilizing, seeding) that will be executed, for example, via an autonomous vehicle example of the vehicle 12. The planning inputs 78 may additionally include the type of agricultural implement 12 to be used, including desired setting for the agricultural implement 12, such as number of row units, type or row units, number of closing systems, type of closing systems, number of fertilizers, type of fertilizing equipment, type of seeds, type of crop to be planted, and so on.

The planning system 72 may then use the one or more of the derived planning features 52, the map 76, and/or the planning inputs 78 to derive the plan 74. For example, the field partitions 58 may be respected and the plan may include different approaches for each partition 58, including starting and stopping points, speeds, directions, turns, obstacle avoidance routes, and so on. In certain embodiments the planning system 72 may also apply neural network pattern matching techniques, data mining techniques, machine learning techniques, and so on, to derive the plan 74. For example, the planning system 72 may execute an expert system that uses a set of rules to determine a more optimal driving route through the one or more field partitions 58, including speeds to use, where to turn, how to turn (e.g., turn degrees), seed deposition rates to use, fertilizer rates to use, preferred paths to take around obstacles, backup paths to take around obstacles, and so on. Similarly, neural networks, data mining, machine learning techniques, and other artificial intelligence (AI) techniques may be used additional to or alternative to expert systems to derive (or to help derive) the plan 74. In this manner, the plan 74 may include operator knowledge and field 14 data that when used, may result in more efficient and more optimal field 14 operations.

Figure 3:
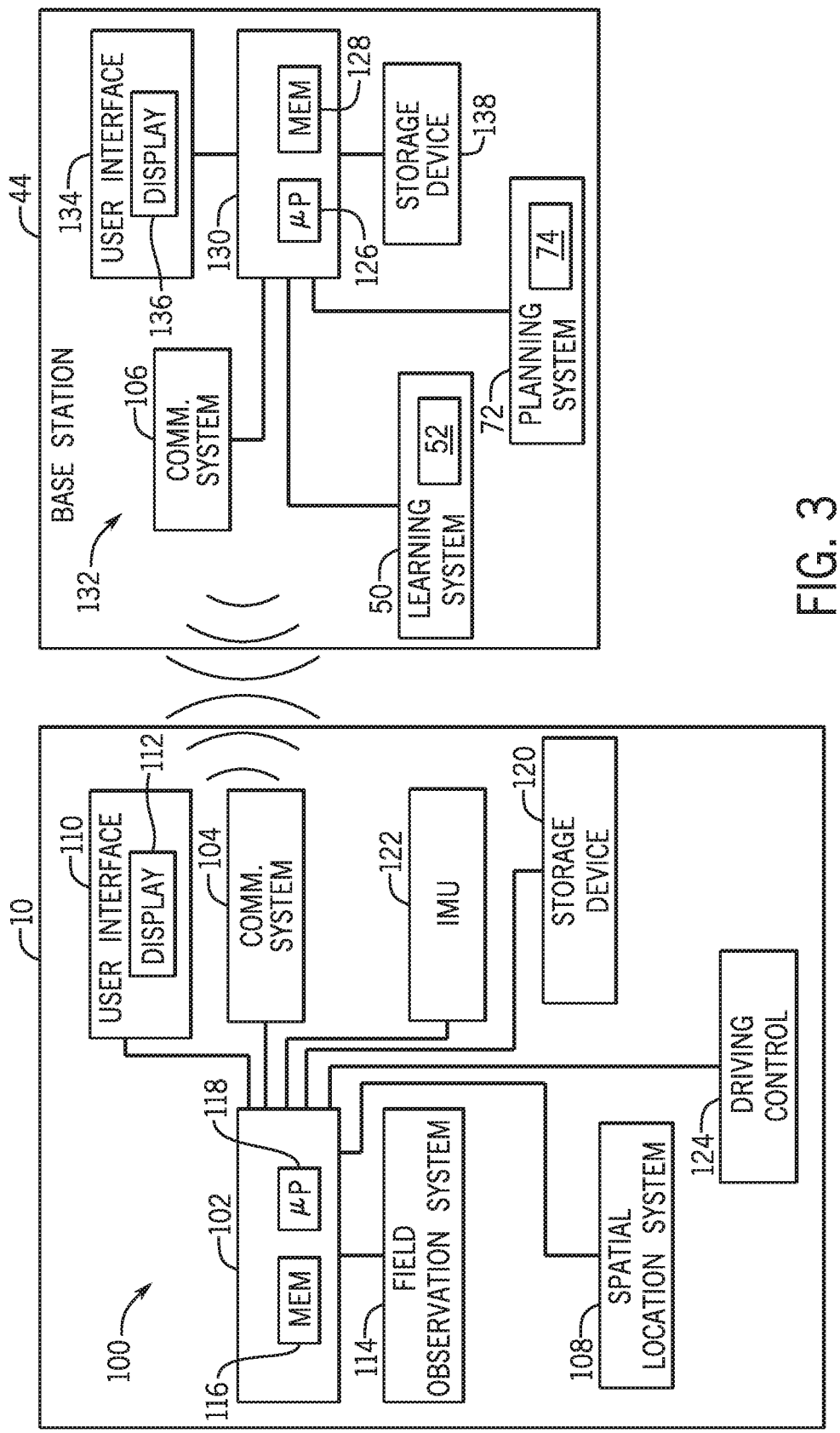
FIG. 3 is a block diagram of an embodiment of computing systems for the agricultural vehicle of FIG. 1, and for a base station.

FIG. 3 is a schematic diagram of an embodiment of a computing system 100 included in the agricultural vehicle 10 that may be utilized to provide for planning data for the field 14 of FIG. 1. In the illustrated embodiment, the computing system 100 includes a computing device 102. The computing device 102 may be a personal computer, workstation, a laptop, a tablet, a notebook, a smartphone, a carputer (e.g., car computer), and the like. A first communication system 104 included in the computing system 100 is configured to establish a wireless communication link with a second communication system 106 of the base station 44. As will be appreciated, the first, and second communication systems 104, 106 may operate at any suitable frequency range within the electromagnetic spectrum. For example, in certain embodiments, the communication systems 104, 106 may include radios or transceivers that may broadcast and receive radio waves within a frequency range of about 1 GHz to about 10 GHz. In addition, the first and second communication systems 104, 106 may utilize any suitable communication protocol, such as a standard protocol (e.g., Wi-Fi, Bluetooth, mesh networking, etc.) or a proprietary protocol.

In the illustrated embodiment, the agricultural vehicle 10 includes a spatial location system 108 which is configured to determine a geographic position of the agricultural vehicle 10. As will be appreciated, the spatial location system 108 may include any suitable system configured to determine the position of the agricultural vehicle 10, such as a global positioning system (GPS), for example, and/or GLONASS or other similar system. In certain embodiments, the spatial locating system 108 may additionally or alternatively be configured to determine the position of the agricultural vehicle 10 relative to a fixed point within the field 14 (e.g., via a fixed radio transceiver). Accordingly, the spatial location system 108 may be configured to determine the position of the scouting vehicle 10 relative to a fixed global coordinate system (e.g., via the GPS), a fixed local coordinate system, or a combination thereof. The spatial location system 108 may additionally use real time kinematic (RTK) techniques to enhance positioning accuracy.

The computing system 102 additionally includes a user interface 110 having a display 112. The user interface 110 may receive inputs from a vehicle operator suitable for recording observations of the field 14, among other inputs. The display 112 may provide for textual and/or graphical visualizations suitable for field operations, among others, of the vehicle 10 and/or agricultural implement 12. Data 54 and 56 may be gathered and/or communicated via a field observation system 114. The field observation system 114 may include, for example, software stored in a memory 116 and executed via one or more hardware processors 118 as described in more detail below. A storage device 120 may also be provided, suitable to store digital data, for example, the data 54 and 56.

The processor 118 may include multiple microprocessors, one or more "general-purpose" microprocessors, one or more special-purpose microprocessors, and/or one or more application specific integrated circuits (ASICS), or some combination thereof. For example, the processor 118 may include one or more reduced instruction set (RISC) processors. The memory 116 may include a volatile memory, such as random access memory (RAM), and/or a nonvolatile memory, such as ROM. The memory 116 may store a variety of information and may be used for various purposes. For example, the memory 116 may store processor-executable instructions (e.g., firmware or software) for the processor 118 to execute, such as instructions for the field observation system 114. The storage device 120 may include a hard drive, an optical drive, a flash drive, a solid state storage medium, or combination thereof, suitable for storing digital data, such as driving data logs, agricultural equipment 12 settings, and so on.

An inertial measurement unit (IMU) 122 may also be included, which may include one or more sensors, such as specific force sensors, angular rate sensors, and/or magnetic field change sensors that may provide for the inertial measurements as the vehicle 10 traverses the field 14. The IMU 122 may be used, for example, in at least two ways. One example of use is for terrain compensation which accounts for motion of the spatial location system 108 antenna due to vehicle 10 pitch and roll motions. The second example of use is through use of a dead-reckoning algorithm (e.g., executable via the processor 118 and stored in the memory 116) that verifies motion of the derived GPS position against acceleration measurements obtained via IMU 122 sensors. Dead-reckoning is used to detect GPS hops (e.g., rapid motion of the GPS position that may be caused by solar and/or atmospheric disturbances) to fine tune the position of the vehicle 10. Another basic use of the IMU 122 is to take a heading measurement to orient the vehicle 10 properly in the mapping software and to compensate for poor heading information from the spatial location system 108 at slow speeds or when stopped. In this manner, more accurate positioning data may be provided as part of the data 54, 56.

In certain embodiments, an operator may drive the vehicle 10 into the field 14 for field operations (e.g., planting, seeding, fertilizing) and the field observation system 114 may then capture the data 54, 56. For example, as the vehicle 10 and agricultural implement 12 is driven through the field 14, the spatial location system 108 and IMU 122 may be used to provide geographic locations, driving direction, speed, and so on, and the field observation system 114 may be continuously capturing the location data, the driving directions, the speed, and so on. Likewise, the field observation system 114 may be communicatively coupled to an OBDII and/or CAN port of the vehicle 10 and data such as fuel usage, RPMs, oil level, speed, and so on, may be captured. Further, the data 54, 56 may be recorded and stored in the memory 116, in the storage device 120, and/or communicated via the communication system 104.

In embodiments where the vehicle 10 is an autonomous vehicle, a driving control system 124 is provided, suitable for autonomously driving the vehicle 10. As mentioned earlier, the spatial location system 108 may be used in conjunction with the IMU 122 to derive accurate position data representative of the position of the vehicle 10 in the field 14. The driving control system 124 may use the derived position and may control driving operations such as steering, acceleration, braking, and other agricultural operations (e.g., planting, tilling, fertilizing) of the vehicle 10 and implement 12 in the field 14. It is to be noted that in certain autonomous embodiments of the vehicle 10, the vehicle 10 may provide for a human operator to control the vehicle 10 as an alternative to the driving control system 124. In these autonomous embodiments, the human operator may drive the vehicle 10 while the field observation system 114 collects the data 54, 56.

The data 54, 56 may be transmitted to the communications system 106 of the base station 44. The base station 44 may then execute the learning system 50 to derive the features 52. Once the features 52 are extracted via the learning system 50, the planning system 72 may be executed to derive the plan 74. As mentioned earlier, the learning system 50 and the planning system 72 may include executable code or instructions. Accordingly, the code or instructions may be executable via processor(s) 126 and stored in a memory 130 included in a computing device 130 of a computing system 132. It is to be understood that the learning system 50 and/or the planning system may disposed in other systems additional to or alternative to the base station 44. In embodiments, where the systems 50 and 72 are software systems the systems 50 and/or 72 may be stored an executed in a desktop computer, a laptop, a notebook, a tablet, a smart phone, and so on.

The computing system 132 may additionally include a user interface 134 having a display 136. The user interface 134 may receive inputs from a planning operator suitable for creating the plan 74, among other inputs. The display 136 may provide for textual and/or graphical visualizations suitable for learning and/or planning operations, among others, of the vehicle 10 and/or agricultural implement 12. Data 54 and 56 gathered and/or communicated via a field observation system 114 may be provided to the learning system 50 to derive the learned features 52. A storage device 138 may also be provided, suitable to store digital data, for example, the features 52 and/or plan 56. It is to be noted that the drawing data 70 may be entered via the user interface 110 and/or the user interface 134.

The processor 126 may include multiple microprocessors, one or more "general-purpose" microprocessors, one or more special-purpose microprocessors, and/or one or more application specific integrated circuits (ASICS), or some combination thereof. For example, the processor 126 may include one or more reduced instruction set (RISC) processors. The memory 128 may include a volatile memory, such as random access memory (RAM), and/or a nonvolatile memory, such as ROM. The memory 128 may store a variety of information and may be used for various purposes. For example, the memory 128 may store processor-executable instructions (e.g., firmware or software) for the processor 118 to execute, such as instructions for the learning system 50 and the planning system 74. The storage device 138 may include a hard drive, an optical drive, a flash drive, a solid state storage medium, or combination thereof, suitable for storing digital data, such as the features 52, the plan 74, driving data logs, agricultural equipment 12 settings, and so on.

Figure 4:
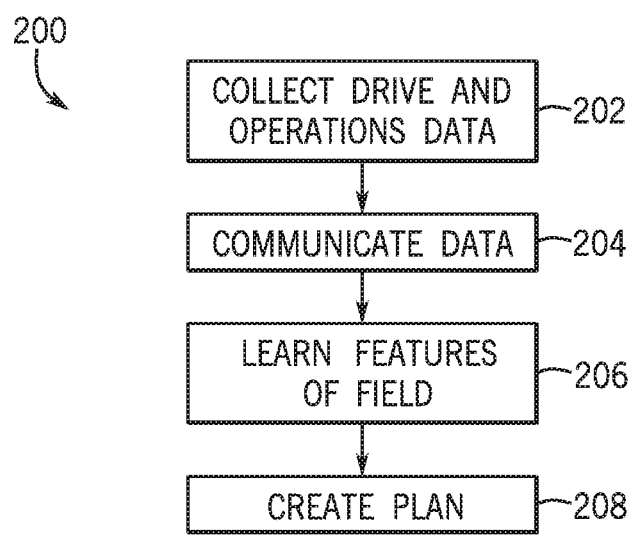
FIG. 4 is a flowchart of an embodiment of a process suitable for learning certain features through observations of field operations and for creating a plan based on the learned features.

FIG. 4 illustrates a flowchart of an embodiment of a process 200 suitable for creating and/or updating plan 74. The process 200 may be implemented as computer instructions or code executable via the processors 118 and/or 126 and stored in the memories 116 and/or 126 and or by storage devices 120, 138. In the depicted embodiment, the process 200 may collect drive and operations data 54, 56 (block 202), as well as drawing data 70. For example, when operating on the field 14, the vehicle 10 may be driven to follow certain operator preferences such as rows 18, turns 22 while respecting field boundaries 28, 32. Accordingly, the vehicle data 54 may include vehicle manufacturer, vehicle model, geographical data detailing one or more drives (e.g., positional data detailing drive points captured at various times, such as every few milliseconds, seconds, minutes, and so on) as the field 14 is planted, seeded, fertilized, and so on. The data 54 may additionally include vehicle speed, vehicle direction, or a combination thereof.

Operations data 56 may include data captures agricultural operations during a drive, such as how much seed is deposited, seed deposition rates, fertilizer rates, planting rates, settings of the agricultural implement 12, types of equipment used, manufacturer of the equipment, and so on. The process 200 may then communicate (block 204) the collected data (e.g., data 54, 56, 70) to external systems, for example systems that may include the learning system 50 and/or the planning system 72.

The process 200 may then learn or otherwise derive (block 206) features 52 of the field 14. For example, the process 200 may execute the learning system 50 to learn field partitions 58, turn features 60, driving features 62, operational setting features 64, operating patterns 66, and other features 68. As mentioned earlier, the learning system 50 may include artificial techniques such as machine learning, neural networks, data mining, expert systems, and so on, that may be used to derive the features 52. Once the features 52 are derived, for example, from observations of field 14 operations, then the features 52 may be used by the planning system 72 to derive or otherwise create (block 208) the plan 74. By learning how field 14 operations are performed, for example, by an experienced farmer, the techniques described herein may result in a more efficient and product plan 74 suitable for execution via an autonomous vehicle.

Figure 5:
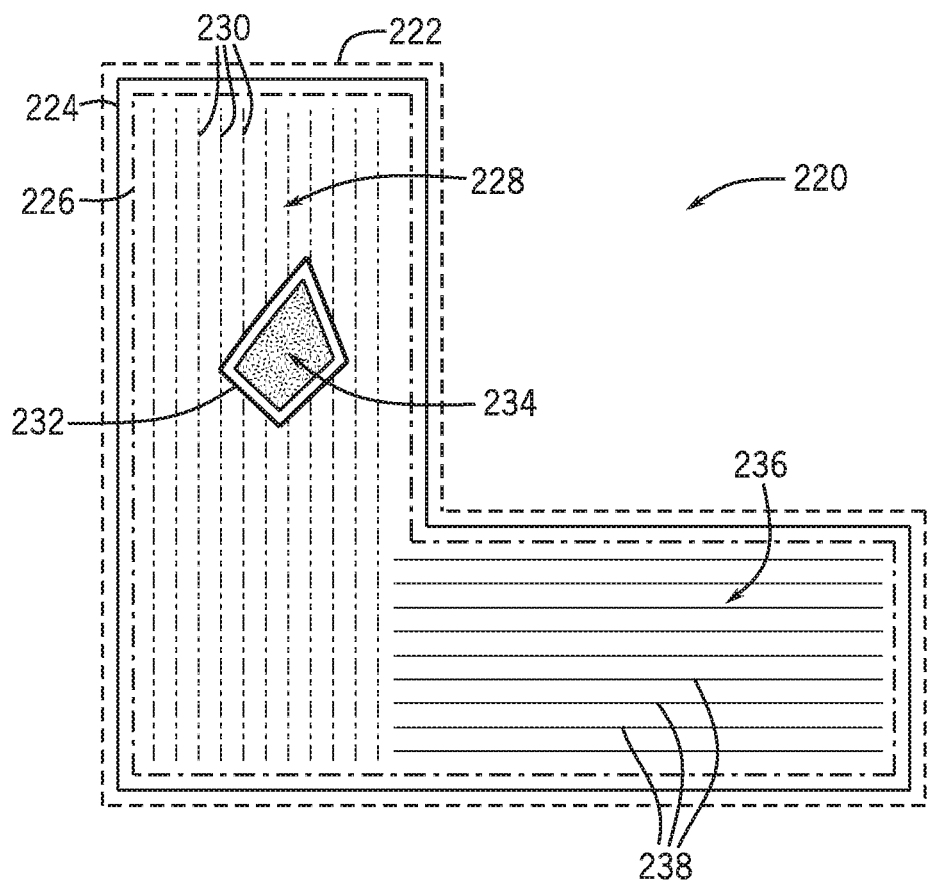
FIG. 5 is block diagram of an embodiment of multiple partitions and features that may be derived from a field via the learning system of FIG. 2.

Turning now to FIG. 5, the figure illustrates an embodiment of a field 220 that may have been observed during agricultural vehicle 10 and agricultural implement 12 operations to derive one or more partitions, among other derived features. In the illustrated embodiment, the field 220 includes an L-shape. As the agricultural vehicle 10 and agricultural implement 12 operate on the field 220 and the data 54, 56 (and/or drawing data 70) is provided to the learning system 50, the learning system 50 may derive that the field 220 was portioned into multiple partitions and features. For example, an exterior boundary 222 may be derived. The exterior boundary defining outer bounds of the field 220. Headland partitions 224, 226 may have been derived, suitable for turning around the field 220. Interior partition 228 is also derived, having various rows 230. Inside of the interior partition 228 a headlands obstacle partition 232 is derived, which surrounds an obstacle 234. A second interior partition 236 is also derived, having rows 238 perpendicular to rows 230. As noted above, the various partitions and features of FIG. 4 may also be derived via a user drawing, for example, on top of a map, and then providing drawing data 70.

An order of operations for the partitions show may also be derived. For example, the operator may first desire to plant inside of partitions 228 first, followed by a planting inside partition 236 second. Accordingly, the agricultural vehicle may follow certain headlands and row orientations in a desired planting order. When harvesting, the order may be different, thus resulting in a harvesting order. Indeed, different operations (e.g., planting, seeding, fertilizing, harvesting), implements 12, implement settings 12, vehicle 10 types, and so on, may result in different order of partition operations. By deriving multiple partitions, partition types, partition order of operations, features, and so on, the techniques described herein may improve planning operations and result in a more efficient and productive plan 74.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
   a processor configured to:
      derive one or more partitions of a field based on a vehicle system data via a learning system;

derive one or more turn features representative of vehicle turns in the field based on the vehicle system via the learning system;

derive an autonomous vehicle plan based on the partitions of the field and the turn features via a planning system, wherein the autonomous vehicle plan comprises a planned route of the autonomous vehicle in the field, wherein the learning system comprises a forward-chained expert system, a backward-chained expert system, a neural network, a data mining system, a state vector machine (SVM), a decision tree learning system, an association rule learning system, a deep learning system, an inductive logic programming system, a genetic algorithm, or a combination thereof.

2. The system of claim 1, wherein the vehicle system comprises an agricultural vehicle towing an agricultural implement and the agricultural implement is configured for agricultural operations on the field, and wherein the autonomous vehicle is configured to apply the autonomous vehicle plan for performing the agricultural operations.

3. The system of claim 1, comprising, deriving an order of operations for the one or more partitions of the field.

4. The system of claim 1, wherein the one or more partitions of the field comprise one or more headland partitions in the field, one or more interior field partitions, or a combination thereof, and wherein each of the one or more interior field partitions comprise an orientation of rows within each of the one or more field partitions.

5. The system of claim 1, wherein the processor is configured to derive one or more operational features, one or more driving features, one or more operating patterns, or a combination thereof, via the learning system based on the vehicle system data.

6. The system of claim 5, wherein the operational features comprise agricultural equipment settings for each of the one or more partitions, wherein the driving features comprise a plurality of rows for each of the one or more partitions, a direction of travel for each of the plurality of rows, a spacing between each of the plurality of rows, a preferred route around an obstacle in the field, or a combination thereof, and wherein the operating patterns comprise a one-way pattern, a gathering pattern, a casting pattern, a spiral pattern, a zig zag pattern, or a combination thereof.

7. The system of claim 1, comprising a user interface system configured to receive a drawing input from a user, wherein the processor is configured to derive the one or more partitions of a field based on the drawing input via the learning system; and to derive the one or more turn features representative of vehicle turns in the field based on the drawing input via the learning system.

8. The system of claim 1, comprising a communications system communicatively coupled to the processor, wherein the processor is configured to receive the vehicle system data transmitted during operations of a vehicle in the field.

9. A method, comprising:

deriving one or more partitions of a field based on a vehicle system data via a learning system;

deriving one or more turn features representative of vehicle turns in the field based on the vehicle system via the learning system;

deriving an autonomous vehicle plan based on the partitions of the field and the turn features via a planning system, wherein the autonomous vehicle plan comprises a planned route of the autonomous vehicle in the field, wherein the learning system comprises a forward-chained expert system, a backward-chained expert system, a neural network, a data mining system, a state vector machine (SVM), a decision tree learning system, an association rule learning system, a deep learning system, an inductive logic programming system, a genetic algorithm, or a combination thereof.

10. The method of claim 9, wherein the vehicle system comprises an agricultural vehicle towing an agricultural implement and the agricultural implement is configured for agricultural operations on the field, and wherein the autonomous vehicle is configured to apply the autonomous vehicle plan for performing the agricultural operations.

11. The method of claim 9 comprising, transmitting, from a vehicle in the field, the vehicle system data during operations of the vehicle in the field.

12. The method of claim 9, comprising deriving an order of operations for the one or more partitions of the field, wherein the one or more partitions of the field comprise one or more headland partitions in the field, one or more interior field partitions, or a combination thereof, and wherein each of the one or more interior field partitions comprise an orientation of rows within each of the one or more field partitions.

13. The method of claim 9, comprising deriving one or more operational features, one or more driving features, one or more operating patterns, or a combination thereof, via the learning system based on the vehicle system data.

14. The method of claim 13, wherein the operational features comprise agricultural equipment settings for each of the one or more partitions, wherein the driving features comprise a plurality of rows for each of the one or more partitions, a direction of travel for each of the plurality of rows, a spacing between each of the plurality of rows, a preferred route around an obstacle in the field, or a combination thereof, and wherein the operating patterns comprise a one-way pattern, a gathering pattern, a casting pattern, a spiral pattern, a zig zag pattern, or a combination thereof.

15. A non-transitory, computer readable medium comprising instructions that when executed by a processor cause the processor to:

derive one or more partitions of a field based on a vehicle system data via a learning system;

derive one or more turn features representative of vehicle turns in the field based on the vehicle system via the learning system;

derive an autonomous vehicle plan based on the partitions of the field and the turn features via a planning system, wherein the autonomous vehicle plan comprises a planned route of the autonomous vehicle in the field, wherein the learning system comprises a forward-chained expert system, a backward-chained expert system, a neural network, a data mining system, a state vector machine (SVM), a decision tree learning system, an association rule learning system, a deep learning system, an inductive logic programming system, a genetic algorithm, or a combination thereof.

16. The non-transitory, computer readable medium of claim 15, wherein the vehicle system comprises an agricultural vehicle towing an agricultural implement and the agricultural implement is configured for agricultural operations on the field, and wherein the autonomous vehicle is configured to apply the autonomous vehicle plan for performing the agricultural operations.

17. The non-transitory, computer readable medium of claim 15, comprising instructions that when executed by the processor, cause the processor to receive, from a vehicle in the field, the vehicle system data during operations of the vehicle in the field.

18. The non-transitory, computer readable medium of claim 15, comprising instructions that when executed by the processor, cause the processor to derived one or more operational features, one or more driving features, one or more operating patterns, or a combination thereof, via the learning system based on the vehicle system data.

19. The non-transitory, computer readable medium of claim 18, wherein the operational features comprise agricultural equipment settings for each of the one or more partitions, wherein the driving features comprise a plurality of rows for each of the one or more partitions, a direction of travel for each of the plurality of rows, a spacing between each of the plurality of rows, a preferred route around an obstacle in the field, or a combination thereof, and wherein the operating patterns comprise a one-way pattern, a gathering pattern, a casting pattern, a spiral pattern, a zig zag pattern, or a combination thereof.

* * * * *